United States Patent
Pupeza et al.

(10) Patent No.: US 9,590,382 B2
(45) Date of Patent: Mar. 7, 2017

(54) ENHANCEMENT RESONATOR INCLUDING NON-SPHERICAL MIRRORS

(71) Applicants: Max-Planck-Gesellschaft zur Foerderung der Wissenschaften e.V., Munich (DE); Ludwig-Maximilians-Universitaet Muenchen, Munich (DE)

(72) Inventors: Ioachim Pupeza, Tuerkenfeld (DE); Henning Carstens, Munich (DE); Simon Holzberger, Munich (DE); Ernst Fill, Garching (DE); Ferenc Krausz, Garching (DE)

(73) Assignees: Max-Planck-Gesellschaft zur Foerderung der Wissenschaften e. V., Munich (DE); Ludwig-Maximilians-Universitaet Muenchen, Munich (DE)

(*) Notice: Subject to any disclaimer, the term of this patent is extended or adjusted under 35 U.S.C. 154(b) by 0 days.

(21) Appl. No.: 14/758,294

(22) PCT Filed: Jan. 16, 2013

(86) PCT No.: PCT/EP2013/000115
§ 371 (c)(1),
(2) Date: Jun. 29, 2015

(87) PCT Pub. No.: WO2014/111097
PCT Pub. Date: Jul. 24, 2014

(65) Prior Publication Data
US 2015/0340833 A1    Nov. 26, 2015

(51) Int. Cl.
*H01S 3/083* (2006.01)
*H01S 3/094* (2006.01)
(Continued)

(52) U.S. Cl.
CPC .............. *H01S 3/083* (2013.01); *H01S 3/005* (2013.01); *H01S 3/086* (2013.01);
(Continued)

(58) Field of Classification Search
CPC ....... H01S 3/083; H01S 3/081; H01S 3/08059
See application file for complete search history.

(56) References Cited

U.S. PATENT DOCUMENTS

| 3,414,839 A | 12/1968 | Bridges et al. |
| 3,826,996 A | 7/1974 | Jaegle et al. |

(Continued)

FOREIGN PATENT DOCUMENTS

| GB | 2139808 A | 11/1984 |
| JP | 2010103104 A | 5/2010 |

(Continued)

OTHER PUBLICATIONS

Carstens et al., "Large-mode enhancement cavities", Optics Express, vol. 21, No. 9, pp. 11606-11617, published May 6, 2013.*
(Continued)

*Primary Examiner* — Eric Bolda
(74) *Attorney, Agent, or Firm* — Caesar Rivise, PC

(57) ABSTRACT

An enhancement resonator (20) being configured for generating intra-resonator laser light (1) by coherent superposition of input laser light, comprises at least three resonator mirrors (21, 22, 23, 24) spanning a ring resonator path in one common resonator plane, said resonator path being free of a laser light amplifying medium, wherein the at least three resonator mirrors (21, 22, 23, 24) include at least two toroidal mirrors and/or at least one cylindrical mirror. Furthermore, a laser device (100) comprising the enhancement resonator (20) and a method of generating intra-resonator laser light (1) are described.

29 Claims, 4 Drawing Sheets

(51) Int. Cl.
| | | |
|---|---|---|
| H01S 3/08 | (2006.01) | |
| H05G 2/00 | (2006.01) | |
| H01S 3/086 | (2006.01) | |
| H01S 3/00 | (2006.01) | |

(52) U.S. Cl.
CPC .......... *H01S 3/08059* (2013.01); *H01S 3/094* (2013.01); *H05G 2/00* (2013.01); *G02F 2203/15* (2013.01)

(56) References Cited

U.S. PATENT DOCUMENTS

| | | | | |
|---|---|---|---|---|
| 5,341,236 | A | * | 8/1994 | Stappaerts ................ G02F 1/37 359/326 |
| 5,848,091 | A | * | 12/1998 | Mombo Caristan ... B23K 26/06 219/121.63 |
| 6,038,055 | A | | 3/2000 | Haensch et al. |
| 6,438,152 | B2 | | 8/2002 | Contag et al. |
| 2005/0243966 | A1 | * | 11/2005 | Loewen ................... G02B 5/10 378/84 |
| 2006/0251217 | A1 | | 11/2006 | Kaertner et al. |
| 2006/0268949 | A1 | | 11/2006 | Gohle et al. |
| 2010/0078580 | A1 | | 4/2010 | Endo et al. |
| 2010/0202071 | A1 | * | 8/2010 | Preumont .............. G02B 26/06 359/849 |
| 2014/0063591 | A1 | * | 3/2014 | Hu ........................ G02F 1/3534 359/330 |

FOREIGN PATENT DOCUMENTS

| | | | |
|---|---|---|---|
| JP | 2011066300 A | * | 3/2011 |
| JP | 2011128428 A | | 6/2011 |
| JP | 2014103331 A | * | 6/2014 |
| WO | 2011060805 A1 | | 5/2011 |
| WO | 2012031607 A1 | | 3/2012 |

OTHER PUBLICATIONS

Yamane et al. "Laser storage ring—2 plane 2 toroidal ring resonator with gain", KEK Report 2011-2, published Jun. 2011.*
Steinbach et al "CW second harmonic generation with elliptical Gaussian beams", Optics Communications, vol. 123, pp. 207-214, (1996).*
Bilger et al., "Origins of fundamental limits for reflection losses at multilayer dielectric mirrors", Applied Optics, vol. 33, No. 31, pp. 7390-7396 (1994).
Byrne et al., "Frequency Doubling for Mode-Locked Laser Pulses", IBM Technical Bulletin, vol. 13, No. 9, pp. 2795-2796 (1971).
Cingoez et al., "Direct frequency comb spectroscopy in the extreme ultraviolet", Nature, vol. 482, pp. 68-71 (2012).
Gohle et al., "A frequency comb in the extreme ultraviolet", Nature, vol. 436, pp. 234-237 (2005).
Hald, "Second harmonic generation in an external ring cavity with a Brewster-cut nonlinear crystal: theoretical considerations", Optics Communications, vol. 197, pp. 169-173 (2001).
Jones et al., "Phase-Coherent Frequency Combs in the Vacuum Ultraviolet via High-Harmonic Generation inside a Femtosecond Enhancement Cavity", PRL, vol. 94, pp. 193201-1-193201-4 (2005).
Kogelnik et al., "Astigmatically Compensated Cavities for CW Dye Lasers", IEEE Journal of Quantum Electronics, vol. QE-8, No. 3, pp. 373-379 (1972).
Lee et al., "Optimizing intracavity high harmonic generation for XUV fs frequency combs", Optics Express, vol. 19, No. 23, pp. 23315-23326 (2011).
Pupeza, "Power Scaling of Enhancement Cavities for Nonlinear Optics", sections 1.2 to 1.4 (10 pages) (2012).
Pupeza et al., "Generation of Coherent sub-20 nm XUV Radiation at 78 MHz via Cavity-Based HHG", EPJ Web of Conferences, vol. 41, pp. 10023-p1-3 (2013).
Pupeza et al., "Power scaling of a high-repetition-rate enhancement cavity", Optics Letters, vol. 35, No. 12, pp. 2052-2054 (2010).
Putnam et al., "Bessel-Gauss beam enhancement cavities for high-intensity application", Optics Express, vol. 20, No. 22, pp. 24429-24443 (2012).
Steinbach et al., "CW second harmonic generation with elliptical Gaussian beams", Optics Communications, vol. 123, pp. 207-214 (1996).
Vodopyanov et al., "Resonantly-enhanced THz-wave generation via multispectral mixing inside a ring-cavity OPO", Lasers and Electro-Optics, 2009 and 2009 Conference on quantum electronics and laser science conference. Cleo/Qels 2009. Conference on, IEEE, Piscataway, NJ, USA, Jun. 2, 2009 (Jun. 2, 2009), pp. 1-2, XP031520299.
International Search Report for PCT/EP2013/000115 dated Sep. 16, 2013.
English language abstract for JP 2011128428 A (2011).
Notification of Reason for Rejection from corresponding JP 2015-553011 issued Aug. 10, 2016.

* cited by examiner

ENHANCEMENT RESONATOR INCLUDING NON-SPHERICAL MIRRORS

FIELD OF THE INVENTION

The invention relates to an enhancement resonator configured for generating intra-resonator laser light by coherent superposition (or: coherent addition) of laser light, e.g. pulsed laser light or continuous-wave (cw) laser light. Furthermore, the invention relates to a laser device comprising a laser source device and the enhancement resonator. Furthermore, the invention relates to a method of generating intra-resonator laser light by coherent superposition of laser light in an enhancement resonator (enhancement cavity, EC). Applications of the invention are available in particular in the technical fields of generating coherent or non-coherent XUV, soft and hard X-ray or THz radiation by interaction of laser light stored inside the enhancement resonator, e. g. with atomic or molecular beams, each either of a clustered or non-clustered structure of the beam constituents, or bunches of relativistic electrons. The generated radiation can be used in particular for laser spectroscopy (e. g. pump-probe-experiments), imaging, lithography, interferometry and holography.

TECHNICAL BACKGROUND

Passive optical resonators can be efficiently excited by laser light as its coherence allows for a constant phase relationship of the input laser light field with the field inside the resonator. Under proper resonance conditions, energy is continuously coupled to the enhancement cavity (EC), enabling a steady state in which the power circulating in the cavity can be several orders of magnitude larger than the input laser light power, the enhancement being limited by the resonator round trip losses and chromatic dispersion. The resonator is called stable if the field distribution of the intracavity light is repeated with each circulation in the resonator. Each resonator is characterized by a certain stability range (range of geometrical parameters). The stability range depends on the geometric properties of the mirror positions, like mirror distances and mirror inclinations relative to a resonator plane, and on optical properties, like focussing distances of the mirrors. At edges of the stability range, i.e. at the edges of the parameter ranges allowing a stable EC operation, slight changes of parameters, e. g. a slightly changing distance between mirrors can essentially impair or even completely deteriorate the coherent light enhancement. At different edges of the stability range, the resonator has different sensitivities to maladjustments and vibrations. If the operation close an edge of the stability range is desired, configurations of the resonator with low sensitivity to maladjustments are preferred.

As in general the efficiency of optical nonlinear processes increases with the driving intensity, the EC technique lends itself to the efficient conversion of laser light via intra-cavity nonlinear processes. The conversion of the fundamental intra-cavity light upon a pass through a nonlinear medium represents round trip losses, which can be adjusted according to the applying nonlinear law and under damage threshold constraints to reach an intensity in the nonlinear medium leading to an optimum of the net conversion (i.e. total converted power divided by input power).

Numerous applications of ECs for the efficient conversion of continuous-wave or pulsed radiation to its harmonics have been proposed (see overview by I. Pupeza, "Power Scaling of Enhancement Cavities for Nonlinear Optics", Springer Theses, Springer N.Y., 2012, Section 1.2, and US 2006/0268949 A1, U.S. Pat. No. 6,038,055). The resonant enhancement of pulsed radiation is made possible by the frequency comb structure of the spectrum emitted by a mode-locked laser which allows for coupling each individual comb line to a cavity resonance. In the time domain this means that the cavity round trip time corresponds to a multiple of the pulse repetition period. This makes ECs suitable for the enhancement of pulse trains with repetition rates between several MHz and several GHz. Recently, average powers on the order of a few tens of kW have been reached with near-infrared intracavity femtosecond pulses (see A. Cingöz et al. in "Nature" 482, 68-71 (2012), I. Pupeza et al. in "Optics Letters" 35, 2052-2054 (2010), and J. Lee et al. in "Optics Express" 19, 23315-23326 (2011)), owing to advances in amplified laser systems operating in this range of repetition rates. Nowadays, in a cavity focus intensities on the order of $10^{14}$ W/cm$^2$ can be readily achieved at repetition rates of several tens of MHz. One of the main motivations for the development of these systems has been the table-top generation of bright coherent extreme ultraviolet (XUV) radiation via high-order harmonic generation (HHG) in a gas (see C. Gohle et al. in "Nature" 436, 234-237 (2005), and R. J. Jones et al. in "Physical Review Letters" 94, 193201 (2005)). Very recently, important new results were achieved in this field, such as record XUV average powers for table-top systems around 20 eV and the first demonstration of radiation with photon energies around 100 eV at repetition rates close to 100 MHz (see I. Pupeza et al. in "Ultrafast Phenomena XVIII", Proceedings of the 18$^{th}$ International Conference, Lausanne, Switzerland, 2012). These experiments confirm the potential of EC-based HHG and show that a viable way to further increase the photon flux of the generated radiation consists in the increase of the intracavity power level along with the nonlinear interaction volume, i.e. the focus size. This scaling would also benefit other conversion processes, such as THz generation or the generation of hard X-rays via Thomson (inverse-Compton) scattering of the circulating photons from the head-on collision with relativistic electron bunches.

However, while significant progress towards higher average powers and shorter pulse durations has been achieved with high-repetition-rate lasers in recent years, with standard-design femtosecond ECs employing current dielectric laser mirrors, further power scaling is impeded by intensity-related mirror damage. I. Pupeza et al. ("Optics Letters" 35, 2052-2054 (2010)) have described that high intensity is the primary cause of mirror damage. While advances in mirror technology might improve the damage threshold in future, there is an interest in the development of resonators with large spot sizes on the mirrors as an independent solution to this problem, since both the intensity and the thermal gradient at the mirror surface are decreased.

WO 2011/060805 discloses a method of generating high power laser light, wherein the resonator mirrors include plane and parabolic mirrors, which are irradiated by at least one laser light pulse circulating in the enhancement resonator with oblique incidence. Due to the oblique incidence, the area irradiated by the laser beam on the resonator mirror surfaces is increased, thus both the intensity and the thermal gradient on the mirror surfaces are decreased. However, this technique may have disadvantages due to a complex mirror and mirror positioning design and may cause unwanted polarization discrimination effects.

WO 2012/031607 discloses a further method of generating laser light in an EC having a plurality of spherically curved resonator mirrors with a detuned concentric configuration. Contrary to the inherent instability of the concentric resonator, the detuned concentric configuration provides a sufficient stability of the EC, which can be operated close to stability edges resulting in an increased beam radius on the mirrors. Nevertheless, the technique of WO 2012/031607 may have disadvantages in terms of an elliptic beam shape deformation occurring with an increasing beam diameter.

Reducing the peak power by enlarging the beam diameter results in astigmatism effects causing a deformation of the light field along the light path in the EC from a circular cross-section towards an elliptic cross-section. The direction of the ellipticity is predetermined by the cavity configuration. This has a particularly detrimental effect, when the EC is adjusted with enlarged beam diameters and thus operated near the edges of the stability range.

OBJECTIVE OF THE INVENTION

The objective of the invention is to provide an improved enhancement resonator, which is capable of avoiding disadvantages of the conventional techniques. In particular, the enhancement resonator is to be capable of enlarging beam diameters and/or shaping the beam cross-sections of intra-cavity light, e. g. enlarging beam diameters on all mirrors, while avoiding astigmatism effects. Furthermore, the objective of the invention is to provide an improved laser device including the enhancement resonator. Furthermore, the objective of the invention is to provide an improved method of generating high power laser light, which is capable of avoiding limitations of the conventional enhancement resonator techniques.

SUMMARY OF THE INVENTION

These objectives are solved by an enhancement resonator, a laser device and a method of generating intra-resonator laser light of the invention.

According to a first aspect of the invention, the above objective is solved by an enhancement resonator, which is configured for generating intra-resonator laser light by coherently superimposing input laser light. The enhancement resonator comprises at least three resonator mirrors spanning a ring resonator path in one common resonator plane, wherein the resonator path is free of a laser light amplifying medium (laser medium, material capable of active laser emission). According to the invention, the at least three resonator mirrors include at least one non-spherical, curved mirror, i. e. at least one mirror having a curved reflective surface deviating from a spherical surface. The at least one non-spherical mirror comprises at least two toroidal mirrors (or: toroidal reflectors) and/or at least one cylindrical mirror. Toroidal mirrors have particular advantages in terms of creating identical focal distances in the tangential plane (resonator plane) and in the sagittal plane (perpendicular to the resonator plane) of the resonator. The advantage of using cylindrical mirrors is the availability of cylindrical mirrors as standard elements having an excellent reflecting surface quality. Preferably, the resonator mirrors do not include a parabolic reflector.

According to a second aspect of the invention, the above objective is solved by a laser device, which comprises a laser source device adapted for creating input laser light, and the enhancement resonator according the above first aspect of the invention. The laser source device and the enhancement resonator are arranged such that the input laser light can be coupled into and coherently enhanced in the enhancement resonator.

According to a third aspect of the invention, the above objective is solved by a method of generating intra-resonator laser light, comprising the steps of coupling input laser light into an enhancement resonator, which preferably is the enhancement resonator according the above first aspect of the invention, and coherent superposition of the input laser light in the enhancement resonator so that the intra-resonator laser light is created. According to the invention, the resonator mirrors of the enhancement resonator include at least one non-spherical, curved mirror, comprising at least two toroidal mirrors and/or at least one cylindrical mirror.

The at least one non-spherical, curved mirror has different radii of curvature relative to the resonator plane. As an example, the toroidal mirror (toroidal reflecting surface) has a first radius of curvature parallel to the resonator plane and a second radius of curvature perpendicular to the resonator plane. The first and second radii differ from each other. Preferably, the first radius is larger than the second radius. As a further example, the cylindrical mirror has a cylindrical reflecting surface having a first radius of curvature parallel to the resonator plane and no curvature perpendicular to the resonator plane or vice versa. Depending on the resonator design, the resonator mirrors may have a concave or convex shape relative to the incident intra-cavity light, or at least one of the resonator mirrors may have a plane reflecting surface.

Advantageously, the invention solves the above objective by the inventor's finding that the resonator mirrors can be designed such that, compared with practically implemented conventional techniques, the beam area of intra-cavity laser light on the resonator mirrors can be enlarged by a factor of at least 10 to 30 and the enhancement resonator is operated near one of the edges of the stability range, while simultaneously the ellipticity of the intra-cavity laser light can be adjusted. In particular, a beam diameter on the resonator mirrors of 5 mm ($1/e^2$ intensity radius) or even larger can be obtained. In contrast to conventional cavity implementations that provide a large intensity ratio between the focus and the spots on the mirrors by using higher-order transverse modes, the inventive enhancement resonator can also be operated with the fundamental mode of the resonator.

Depending on the application of the enhancement resonator, the ellipticity of the intra-cavity beam can be adjusted such that its ellipticity (astigmatism) is compensated resulting in an improved operation of the enhancement resonator near the edge of the stability range. With a circular beam, an even larger spot size on the mirrors is achieved. Moreover, the interaction volume and phase matching for nonlinear effects such as HHG is optimized with a circular beam. Alternatively, for particular applications, the ellipticity of the intra-cavity beam can be adjusted such that a predetermined elliptic cross-sectional shape of the intra-cavity laser light is obtained at one of the enhancement resonator foci, thus improving the efficiency of creating and/or output coupling higher harmonic radiation or the fundamental radiation itself from the enhancement resonator as described below.

Contrary to conventional enhancement resonators, the at least one non-spherical, curved mirror provides an additional degree of freedom so that the beam diameter and the ellipticity can be set independently from each other. The invention provides a design of robust optical enhancement resonators with large spot sizes on all mirrors, a measure that promises to mitigate limitations of conventional enhancement resonators by decreasing both the intensity and the thermal gradient on the mirrors surfaces. In conjunction with a high-repetition-rate laser, the inventive cavity offers the prospect of the enhancement of femtosecond pulses to the MW average power level. As, with a preferred embodiment of the invention, the enhancement resonator is designed exclusively with reflecting elements and in particular the resonator path is free of a refractive element arranged for beam-shaping of the intra-resonator laser light, unwanted interactions of the intra-cavity light with material in the enhancement resonator can be avoided. Exclusively reflecting elements have advantages in terms of low dispersion, low losses and minimization of thermal and nonlinear effects. Contrary to the EC of WO 2011/060805, the invention avoids parabolic mirrors and the potential disadvantages thereof.

Advantageously, multiple enhancement resonator designs are available which can be selected in dependency on the particular application of the invention. According to a first variant, the at least three resonator mirrors include said at least two toroidal mirrors and at least one plane mirror. Advantageously, a compact design is obtained with a group of even three mirrors consisting of the two toroidal mirrors and the one plane mirror. Alternatively, the enhancement resonator may comprise two toroidal mirrors and two plane mirrors, which advantageously provide a so called bow tie configuration. According to a second variant, the at least three resonator mirrors include at least one cylindrical mirror and at least two spherical mirrors. With this variant, preferably, two cylindrical mirrors and two spherical mirrors are provided having a bow tie configuration. According to a third variant, at least one cylindrical mirror and at least one spherical mirror can be provided in the enhancement resonator. Again, further degrees of freedom are obtained for designing the intra-cavity light in terms of beam diameters and ellipticity.

Further enhancement resonator designs are possible, which differ with regard to the angles of incidence on the resonator mirrors. According to preferred embodiments of the invention, the spherical and/or toroidal resonator mirrors can be arranged for a nearly perpendicular angle of incidence, in particular with an angle of incidence of the resonator path on each resonator mirror below 20°, e. g. below 10°. With these embodiments, advantages in terms of minimized spherical aberrations on the mirrors are obtained.

According to alternative embodiments of the invention, the resonator mirrors can be arranged for large angles of incidence. In particular, two toroidal mirrors and at least one plane mirror can be arranged with a configuration such the angles of incidence are at least 30° on all mirrors. With two toroidal mirrors and a plurality, e. g. more than 5 or even more than 8 plane mirrors, angles of incidence of more than 50° or even more than 65° can be obtained. Provision of the large angles of incidence has advantages due to the increased illuminated area on the mirror surfaces. The inventors have found that a considerable deviation of the resonator fundamental transverse eigenmode from a Gaussian beam may occur with the large angles of incidence as a result of the deviation of toroidal or cylindrical mirror curvatures from the parabolic phase front of a Gaussian beam.

Additionally, with all above variants, the inventive enhancement resonator may further include plane folding mirrors that provide a folded configuration of the resonator path. Advantageously, the folded configuration allows an elongation of the resonator path and an increasing beam diameter of the intra-cavity light.

According to further preferred embodiments of the invention, the spherical mirrors and/or the toroidal mirrors and/or the cylindrical mirrors have identical surface shapes and curvatures, resp., and the resonator path has identical angles of incidence on all resonator mirrors. With these variants, advantages in terms of resonator symmetry can be obtained.

According to particularly preferred embodiments of the invention, each one of the toroidal mirrors has identical focal lengths in the resonator plane and in a plane perpendicular to the resonator plane for the angle of incidence realized in a given embodiment. In other words, the two toroidal mirrors preferably have identical focal lengths in the sagittal and tangential plane, or the two toroidal mirrors have radii of curvatures in the sagittal and tangential plane such that the focal length is identical in both planes. With these embodiments the light intensity in and/or near the resonator focus can be maximized.

The resonator mirrors preferably comprise dielectric mirrors, i. e. mirrors having a reflecting surface made of a stack of dielectric layers. Preferably, the resonator mirrors have a reflectivity above 0.99, in particular above 0.9999. The reflecting surface can be supported by a mirror substrate, like a compact body, made of e. g. quartz glass or sapphire or silicon, and the non-spherical curvature is obtained by mirror grinding and polishing.

According to an alternative embodiment of the invention, the at least one non-spherical, in particular the at least two toroidal mirrors and/or the at least one cylindrical mirror, comprise adaptive reflectors having deformable surfaces. The mirror substrate is made of a flexible material and an adjustable support as it is known from adaptive optics. In other words, the toroidal and/or cylindrical mirrors are adaptable by deformation, and the toroidal and/or cylindrical surface shape can be obtained by deformation. As examples, the cylindrical shape can be obtained by deformation of a plane mirror, and the toroidal shape can be obtained by deformation of a spherical mirror. With this embodiment using adaptive reflectors, the inventive method includes the step of setting the deformable spherical or plane surface of at least one of the adaptive reflectors. This setting step can be implemented with a control loop, wherein the adaptive reflectors are adjusted in dependency on a measured beam diameter, beam overlap and/or other beam parameters.

According to a further advantageous feature of the invention, the inventive resonator cavity is configured such that cross-sectional areas of the intra-resonator laser light perpendicular to the incident propagation direction thereof on the reflecting surfaces of the resonator mirrors differ from each other no more than 10%, in particular 5%. According to a particularly preferred embodiment, the at least three resonator mirrors are configured such that the cross-sectional areas are identical or differ from each other no more than 1%. With the above similarity or identity of the cross-sectional areas, the resonator can be operated at an edge of the stability range having a low sensitivity to maladjustments, and a symmetry of the resonator path relative to a plane through the resonator foci and perpendicular to the resonator plane is obtained. Furthermore, increased intensities on one or more of the mirrors can be avoided.

While the above configuration is defined with reference to the cross-sectional areas of the intra-resonator laser light, the resonator configuration is a device feature of the resonator as such. The cross-sectional areas are operational representations of the properties of resonator modes obtained by the resonator cavity configuration. Configuring the resonator cavity in particular includes providing the at least three resonator mirrors with a predetermined curvature of the reflecting surface. The curvature can be fixed due to the use of a solid mirror substrate, or variably adjusted if one or more adaptive reflectors are used. Additionally or alternatively, configuring the resonator cavity includes an adjustment of the at least three resonator mirrors in terms of the mutual distance thereof, the inclination relative to the resonator plane and/or the angles of incidence.

Advantageously, multiple mirror configurations are available for implementing particular applications of the invention. According to a preferred variant, the at least three resonator mirrors are configured such that the cross-sectional area of the intra-resonator laser light perpendicular to the propagation direction thereof has a circular shape along the resonator path. With this embodiment, advantages for a higher harmonic radiation generation are obtained as the circular beam shape in a resonator focus improves the nonlinear generation of the higher harmonic radiation. According to another preferred variant, the at least three resonator mirrors are configured such that the cross-sectional area(s) of the intra-resonator laser light perpendicular to the incident propagation direction thereof on the reflecting surfaces of said resonator mirrors has/have an elliptic shape, wherein the larger main axis of the elliptic shape is parallel to the resonator plane. This allows a mode shaping in the resonator foci, which can have advantages with regard to frequency conversion processes with a transverse mode (circulating field distribution) other than the fundamental one and coupling of higher harmonic radiation out of the cavity.

If the enhancement resonator is adapted for the higher harmonic radiation generation, preferably, a target material is provided at one of the resonator's foci, and an output coupling device is provided, which is configured for coupling of radiation created by an interaction of the intra-resonator laser light with the target material or the electron bunch out of the enhancement resonator.

Multiple output coupling techniques are available. However, according to a particularly preferred embodiment of the invention, the output coupling device comprises one of the resonator mirrors having a hole (aperture) for output coupling the created radiation. Such an output coupling device is described e. g. in WO 2012/031607. Output coupling through an on-axis hole in a resonator mirror has particular advantages with the inventive enhancement resonator. As the enhancement resonator allows the creation of enlarged beam radii, the radius of the hole in the output coupling resonator mirror is smaller relative to the beam radius on this mirror compared with the conventional technique. Accordingly, the output coupling resonator mirror reduces resonator loss and thus allows a further increasing of the intensity of the circulating intra-cavity light and generating higher harmonic radiation with reduced wavelengths. On the other hand, for a given enhancement, i.e. for a fixed ratio of the hole and the spot size diameters, a larger spot size means that the influence of an imperfect hole boundary on the XUV for output coupling efficiency is reduced. This property is important in practice because larger holes are available in better quality. This offers the prospect of a high-power XUV source for short wavelengths (e. g. 13 nm, as applied in the semiconductor industry, or even shorter).

If the inventive enhancement resonator is applied for generating hard X-rays via Thomson (inverse Compton) scattering, an increase of the driving laser power of at least one order of magnitude over the conventional systems can be obtained.

Further general advantages of the invention are obtained by combining high repetition rates with high pulse energies and short pulse durations (e. g., the enhancement of sub-30 fs pulses has been demonstrated). In particular, the cavity is broadband, due to the lack of intracavity optics other than the mirrors. Such a cavity can be implemented with only 3 or 4 mirrors, which is a small number. Together with the relatively small angles of incidence on the mirrors, the lack of any polarization-discriminating element makes the cavity polarization maintaining. In particular this means that CW or pulsed light with any linear and elliptical polarization (and also combinations thereof) can be enhanced efficiently. With HHG, XUV generation can be confined to a single cycle (or a few cycles) of the driving light, providing ultrashort XUV pulses which enable a very fine temporal resolution for time-resolved measurements. Finally, the invention can be implemented with a large range of wavelengths, for which the applied models of Gaussian optics hold and for which high-quality optics exist. In particular, the resonator cavities can be constructed for a wavelength range from the UV via the visible range to the mid-infrared range.

BRIEF DESCRIPTION OF THE DRAWINGS

Further features and advantages of the invention are described in the following with reference to the attached drawings, which show in.

PREFERRED EMBODIMENTS OF THE INVENTION

Figure 10:
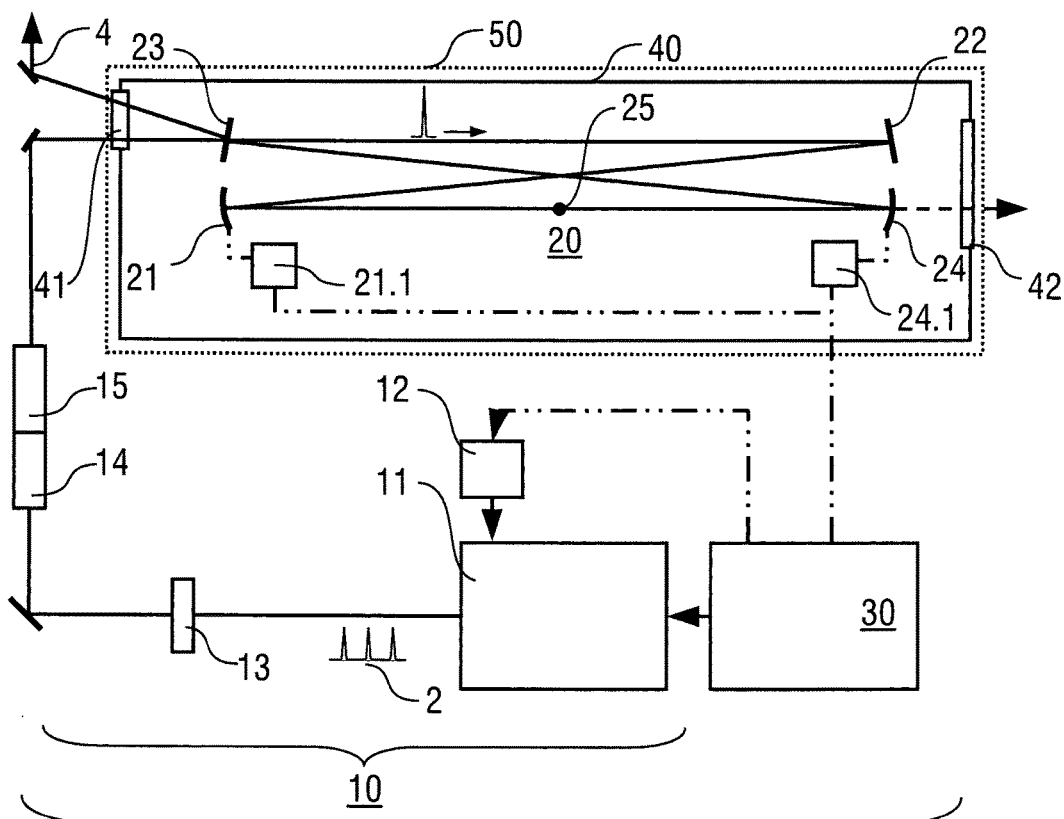
FIG. 10: a schematic illustration of a further embodiment of a laser device according to the invention.

Embodiments of the invention are described in the following with exemplary reference to enhancement resonators having four or three resonator mirrors (see FIGS. 1 to 4). It is emphasized that the invention can be implemented in an analogue manner with more than four resonator mirrors, e. g. twelve resonator mirrors (see FIG. 5). The resonator geometry can be adjusted by experiment or by numerical design of the optical set-up based on available software solutions. Preferred embodiments of the invention are described with particular reference to the provision of non-spherical resonator mirrors. Therefore, FIGS. 1 to 5 focus on the enhancement resonator design, while FIG. 10 illustrates further optional features of an inventive laser device. In the Figures, all of non-spherical resonator mirrors (and the optionally used spherical resonator mirrors) are schematically shown with a curved shape. The reflector shapes practically used are indicated with abbreviations (plane: "pl", cylindrical: "cyl", toroidal: "tor", or spherical: "sph"). Features of the method of generating high power laser light and the laser device, in particular with regard to the design and adjustment of an input coupling mirror, the synchronisation of the laser source device and the enhancement resonator, and the provision of the enhancement resonator in an environment of reduced gas pressure (in particular air pressure), are not described as far as they are known from conventional techniques, e. g. from WO 2012/031607, U.S. Pat. No. 6,038,055 or US 2006/0268949 A1, the contents of which being introduced into the present disclosure by reference.

Figure 1:
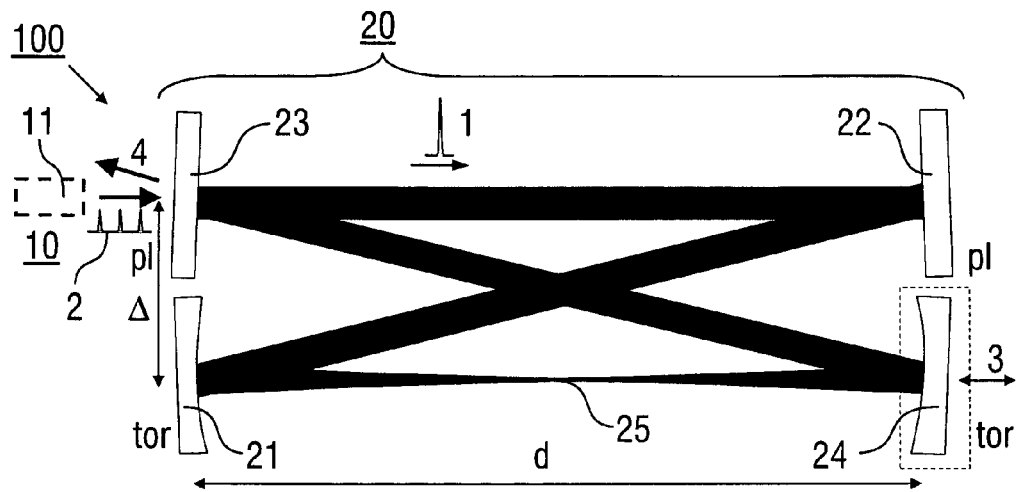
FIGS. 1 to 5: schematic illustrations of a laser device and enhancement resonators according to preferred embodiments of the invention.

FIG. 1 schematically shows an embodiment of the inventive laser device 100, which comprises a laser source device 10 and an enhancement resonator device 20. The laser source device 10 comprises a laser unit 11 (see FIG. 10), which is arranged for generating primary laser light pulses 2 or cw modes to be coupled into the enhancement resonator 20. The laser unit 11 comprises any conventional pulsed or continuous-wave laser, like e. g. a titanium-sapphire laser, a Yb:KYW laser or a combination of a pulsed laser with a amplification (e.g. chirped pulse amplification (CPA)) system. As an example, the laser unit 11 is operated such that the primary laser pulses 2 are generated with a repetition rate of 250 MHz, a pulse duration of 200 fs, an optical average power of 200 W to 500 W or more and a centre wavelength of about 1042 nm. Further details of the laser source device 10 are described below with reference to FIG. 10. Additionally, the laser device 100 includes monitoring and control units (not shown) as it is known from conventional applications of enhancement resonators.

The enhancement resonator 20 of FIG. 1 represents a first embodiment of the invention, wherein two toroidal (tor) resonator mirrors 21, 24 and two plane (pl) resonator mirrors 22, 23 are arranged in a bow tie configuration. This configuration is characterized by a ring resonator geometry with crossed beam paths, wherein the resonator mirrors 21 to 24 span a resonator laser light path in a common plane, e. g. in a horizontal plane (parallel to the drawing plane). The resonator laser light path has a complete length $L_{res}$ being equal to integer multiples of $n_{ref}*c/f_{rep}$ (c: speed of light in vacuum, $f_{rep}$: repetition rate of the laser light pulses 2, $n_{ref}$: average refractive index on the light path).

The resonator mirrors 21 to 24 are e. g. highly reflecting dielectric mirrors as described e. g. by H. R. Bilger et al. ("Origins of fundamental limits for reflection losses at multilayer dielectric mirrors", Appl. Opt., Vol. 33, No. 31, p. 7390-7396 (1994)). They comprise an input coupling mirror 23 (IC-mirror 23) and three highly reflecting resonator mirrors 21, 22 and 24 (HR-mirrors 21, 22 and 24). The substrate of the input coupling mirror 23 is transparent, and typically one side is provided with an anti-reflection coating optimized for the angle of incidence of the laser beam. The HR-mirrors 21, 22 and 24 have a higher reflectivity than the IC-mirror 23. The reflectivities of the mirrors are selected in dependency on the particular application of the invention.

The reduced reflectivity of the IC mirror 23 is provided for setting the power enhancement factor and providing a test signal 4. As an example, the IC mirror 23 transmission can be equal to the complete round trip losses of the resonator (except for the input coupling mirror) due to scattering, absorption, transmission and interaction of the circulating light with a nonlinear medium, i.e. impedance matching. In the case of impedance matching, the power enhancement is maximized for a given round trip loss. The test signal 4 reflected at the IC mirror is sensed with a photodiode and guided to a control device (see FIG. 10) for implementing a control system stabilizing the relative operation parameters of the laser source device 11 and the enhancement resonator 20.

While FIG. 1 represents a schematic illustration only, the enhancement resonator 20 has a longitudinal shape in practice, wherein the lengths of the resonator laser light path sections between the resonator mirrors 21 to 24 are approximately equal, e. g. 600 mm. As a result, the crossing angle of the resonator laser light path sections below 5° can be obtained, and the angles of incidence are about 1.2°. In the illustrated embodiment, the resonator mirrors 21 and 24 are toroidal mirrors with equal surface curvatures. A first radius of curvature $R_1$ in a sagittal plane is e. g. 600.13 mm, while a second radius of curvature $R_2$ in a tangential plane is e. g. 599.87 mm. As a typical example, the toroidal and plane mirrors have a diameter of about 25 mm. The radii of curvature can be experimentally adjusted, or practical values can be obtained by numerical simulations based on available resonator design software.

All of the resonator mirrors 21 to 24 can be shifted, rotated and/or inclined by mirror drive units (not shown) for adjusting the distances d and Δ there between and/or angles of incidence on the mirror surfaces, resp. The distances d and Δ refer to the spacing between the beam centers on the mirror surfaces, resp. As an example, distance d can be changed by a mirror drive unit (translation table) carrying resonator mirror 24 (see arrow 3).

Figure 2:
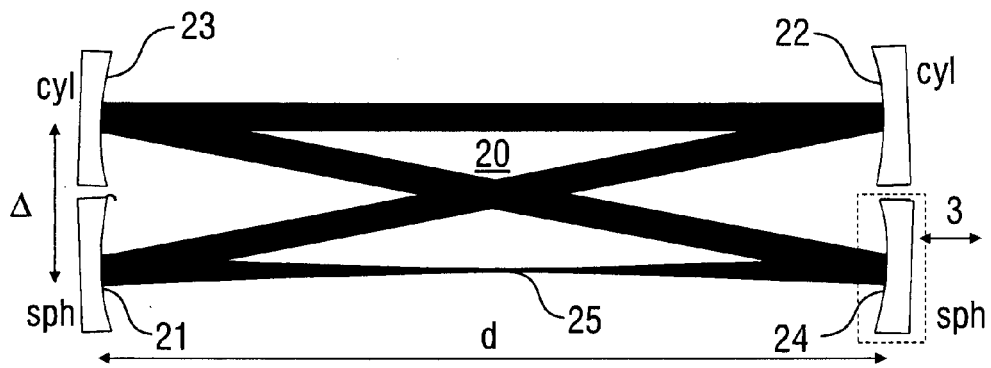

FIG. 2 illustrates a second embodiment of the invention, wherein the enhancement resonator 20 comprises two spherical (sph) mirrors 21 and 24 and two cylindrical (cyl) mirrors 22 and 23. One focal position 25 is provided between the resonator mirrors 21 and 24. Both spherical mirrors 21 and 24 have a diameter of e. g. 25 mm and a radius of curvature R of e. g. 600 mm. The cylindrical mirrors 22 and 23 have a rectangular or quadratic shape, e. g. with a size of 25 mm*25 mm, and a radius of curvature $R_1$ in the tangential plane of e. g.—100000 mm (defocusing surface). Again, all of the resonator mirrors 21 to 24 can be shifted, rotated and/or inclined.

Figure 3:
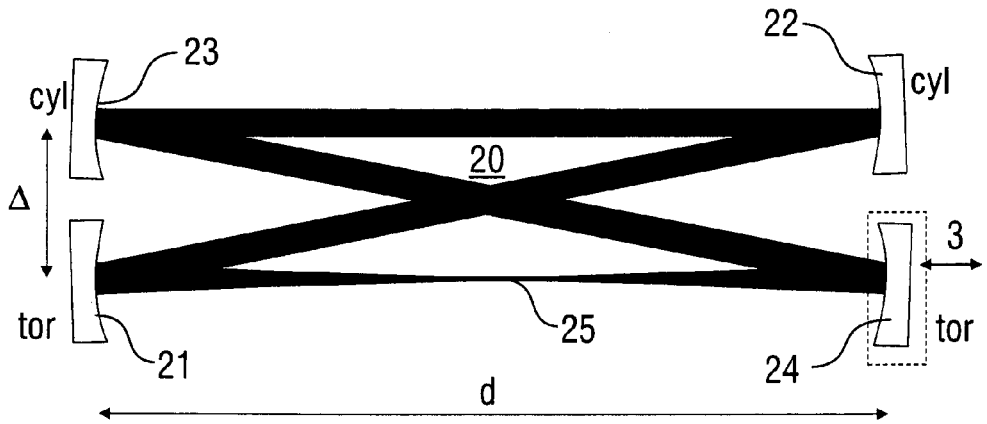
Figure 4:
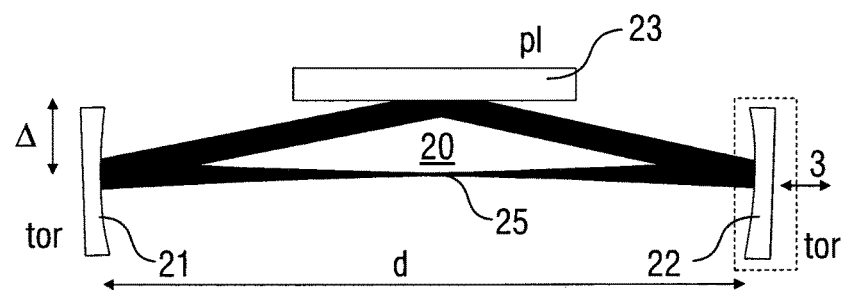

According to a further embodiment of the invention, as schematically illustrated in FIG. 3, the enhancement resonator 20 comprises two toroidal mirrors 21 and 24 and two cylindrical mirrors 22 and 23. FIG. 4 illustrates another embodiment of the invention, wherein the enhancement resonator 20 has a triangular configuration. It comprises three resonator mirrors only including e. g. two toroidal mirrors 21, 22 and one plane or cylindrical mirror 23. Alternatively, the embodiment of FIG. 4 could include two spherical (21, 22) and one cylindrical (23) mirror. The enhancement resonator and the resonators mirrors of FIGS. 3 and 4 can be configured as with the embodiments of FIGS. 1 and 2. While FIGS. 2 to 4 refer to the use of concave cylindrical mirrors, the inventive resonator design can be implemented with convex cylindrical mirrors as well.

Figure 5:
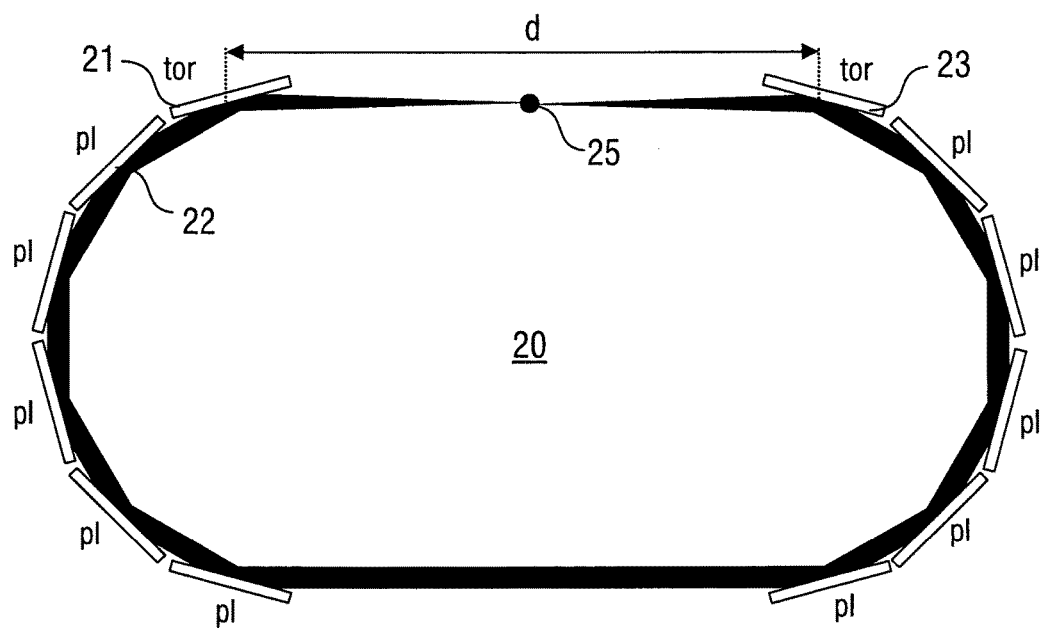

FIG. 5 illustrates an alternative embodiment of the invention, wherein the resonator mirrors are arranged with large angles of incidence. With this example, the enhancement resonator comprises two toroidal mirrors 21, 23 and ten plane mirrors 22, wherein angles of incidence of 75° are obtained resulting in an increase of the illuminated area on the mirrors by a factor of 3.8. Light is coupled into the resonator 20 at one of the plane mirrors 22. The focus 25 is created between the toroidal mirrors 21, 23. Generally, with more N mirrors (N≥3, two toroidal mirrors and at least one plane mirror) and identical incidence on all mirrors, angles of incidence of 90° *(1−2/N) can be set.

For obtaining a resonator focus 25 with a circular profile, the two toroidal mirrors have identical focal lengths in the sagittal and tangential plane of the resonator 20 for the chosen angle of incidence on the toroidal mirrors. To this end, the radii of curvature of the toroidal mirrors 21, 23 in the sagittal and tangential plane, $R_{sag}$ and $R_{tan}$ are selected in dependency on the angles of incidence according to $R_{sag}=2$ f cos α and $R_{tan}=2$ f/cos α (f: focal length). With a practical example, the radii may be $R_{sag}=158$ mm and $R_{tan}=2280$ mm.

Preferably, all of the resonator mirrors 21 to 24 can be shifted for adjusting the distances d and Δ. Optionally, resonator mirror 24 can be shifted only (see arrow 3). Furthermore, they can be rotated in the resonator plane and inclined relative to the resonator plane for adjusting angles of incidence on the mirror surfaces. For these adjustments, each of the resonator mirrors 21 to 24 is supported by a mirror drive unit and connected with an adjustment stage (not shown) as it is known from conventional resonators.

The inventive method of generating high power laser light using the laser device 100 of FIG. 1 comprises the following steps. Laser light 2 is generated with a predetermined pulse repetition rate or cw frequency using the laser source device 10. The laser light 2 is coupled into the enhancement resonator 20 through the IC-mirror 21. The laser source device 10 and/or the enhancement resonator 20 are mutually adjusted such that the laser light coupled into the enhancement resonator 20 is coherently superimposed with the intra-resonator laser light 1. In pulsed operation the number of circulating intra-resonator pulses can be adjusted by selecting at least one of the enhancement resonator 20 length and the laser source device's 10 repetition rate relative to each other. The circulating intra-resonator pulse(s) irradiate(s) the mirror surfaces with a $1/e^2$ beam radius of the intensity of about 2 mm to 6 mm. As a result, the average power of the intra-resonator pulse(s) can be increased up to the range above 0.5 MW, e. g. above 1 MW. This provides a focus peak intensity up to about $1*10^{16}$ W/cm$^2$.

For generating coherent or non-coherent light pulses in an XUV/X-Ray or THz frequency range, a target, like e. g. atomic or molecular gases (like noble gases, nitrogen or oxygen), or atomic and molecular clusters (van-der-Waals, metallic or ionic clusters), is supplied at or close to the focal position 25 between resonator mirrors 21 and 24. Due to the interaction of the intra-resonator laser light 1 with the target, coherent radiation in the XUV/X-Ray wavelength range is generated, which is coupled out of the enhancement resonator 20, e. g. through a gap between the mirrors 22 and 24 or aside them, through an aperture, e. g. a cylindrical and cone hole in mirror 22 (see FIG. 9) or a slit, by a plate under Brewster's angle for the intra-resonator laser light, by a diffraction grating for XUV wavelengths etched onto a plane mirror or by a Bragg-crystal for X-Ray wavelengths. Non-coherent radiation is collected and guided by appropriate optics, e. g. a toroidally bent crystal, grazing incidence multilayer optics and ellipsoidal—or poly-capillaries in case of X-ray radiation. THz radiation is collected and guided e. g. by metal, photonic crystal or multilayer mirrors and optics made from silicon, high density polyethylene, polymethylpentene or polytetrafluoroethylene.

In the following, the intensity regime is estimated which can be achievable with the astigmatism-compensated cavity of FIGS. 1 to 3 in conjunction with a state-of-the art high-power 250 MHz repetition rate femtosecond laser.

One prospect offered by the inventive resonator design is an increase of the peak intensity in the focus to values exceeding $10^{15}$ W/cm$^2$ in the $w_0$=25 µm focus with $w_m$=4 mm spots on all mirrors, with compressed 25 fs pulses and an intracavity average power of 125 kW. The same intensity can be obtained with 250 fs pulses at an average power exceeding 1 MW. This intensity corresponds to a cut-off wavelength of less than 2 nm via high-order harmonic generation in helium.

Another prospect offered by the inventive resonator is that of increasing the focal volume at a given peak intensity, which can be achieved by using weaker focusing. A peak intensity of $2.8*10^{14}$ W/cm$^2$, which allowed for the generation of 13 nm plateau harmonics in the past, can be achieved with 25 fs pulses at a power enhancement of 350 in a $w_0$=52 µm focus and with beam radii of $w_m$=3.2 mm on the resonator mirrors. This setup allows for the inclusion of a micrometer sized aperture (85 µm radius) in the mirror subsequent to the cavity focus while still working with the required power enhancement of 350 in an impedance matched configuration. The increase of the focal volume by roughly two orders of magnitude with respect to the setup presented by I. Pupeza et al. in "Ultrafast Phenomena XVIII, Proceedings of the 18$^{th}$ International Conference, Lausanne, Switzerland, 2012" drastically increases the generated XUV photon flux due to the larger nonlinear interaction volume, improved phase matching and higher output coupling efficiency. Furthermore, the intensity regime of $10^{15}$ W/cm$^2$ is suitable for inverse-Compton scattering.

The illustrated inventive resonator cavities can be implemented with one of the following design variants. The resonator cavity can be configured such that cross-sectional areas of the intra-resonator laser light 1 perpendicular to the incident propagation direction thereof on the reflecting surfaces of the resonator mirrors 21 to 24 differ from each other no more than e. g. 1%. This yields the advantage of low adjustment sensitivity. Additionally, the resonator cavity can be configured such that the cross-sectional areas are circular on all reflecting surfaces of the resonator mirrors 21 to 24. This yields the advantage of enlarged beam diameters and enlarged focussing volumes, so that XUV or hard X-rays can be generated with improved efficiency. Alternatively, the resonator cavity can be configured such that the cross-sectional areas have large ellipticity on all reflecting surfaces of the resonator mirrors 21 to 24, yielding advantages for output coupling XUV or hard X-rays.

Figure 6:
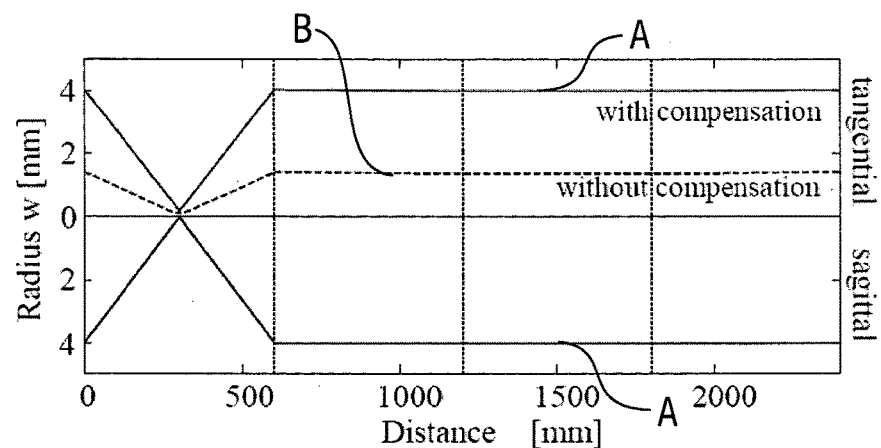
FIGS. 6 to 8: experimental and simulation results obtained with the inventive enhancement resonator.
Figure 7:
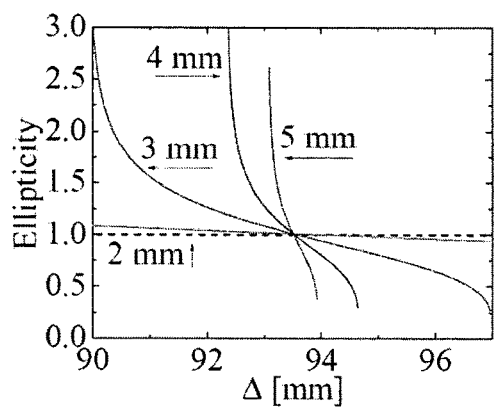
Figure 8:
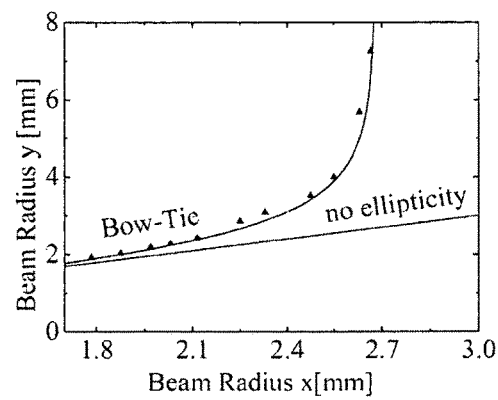

Experimental and simulation results obtained with the inventive enhancement resonator 20 of FIG. 2 are illustrated in FIGS. 6 to 8. Curves A of FIG. 6 show the simulated beam radii in the tangential and sagittal planes, resp., along the beam direction (z-direction) in an 125 MHz enhancement resonator according to FIG. 2 with 600 mm focusing mirrors and angle of incidence 4.4°. Accordingly, with the invention, the ellipticity has been removed by substituting the plane mirrors of the conventional bow-tie resonator with the cylindrical mirrors 22, 23 (−100 m ROC) defocusing in the tangential plane. The vertical lines indicate the position of the mirrors. Curve B shows that the beam radius in the tangential plane of an equivalent conventional bow-tie resonator (with spherical and plane mirrors only) is essentially smaller than the beam radius in the sagittal plane (corresponding to lower curve A). FIG. 7 shows the simulated ellipticity (ratio of main axes lengths, calculated in the focus) as a function of Δ (as shown in FIG. 2) for different spot sizes in the sagittal plane. For larger spot sizes a better alignment accuracy is required. With weaker cylindrical mirrors, the compensation is achieved for smaller distance Δ, requiring less accuracy. Experimental results are presented in FIG. 8, which shows measured beam radii ($1/e^2$-intensity radii) in both tangential and sagittal planes for the inventive resonator while the stability edge was approached. The theoretical curve is calculated with the ABCD-matrix formalism. With constant cavity losses, a spot size of 5.7 mm*2.6 mm could be achieved. Even larger spots could be obtained, however at the cost of diffraction losses at the mirror boundaries. In principle this can be overcome by using larger mirrors and measures for astigmatic compensation.

Figure 9:
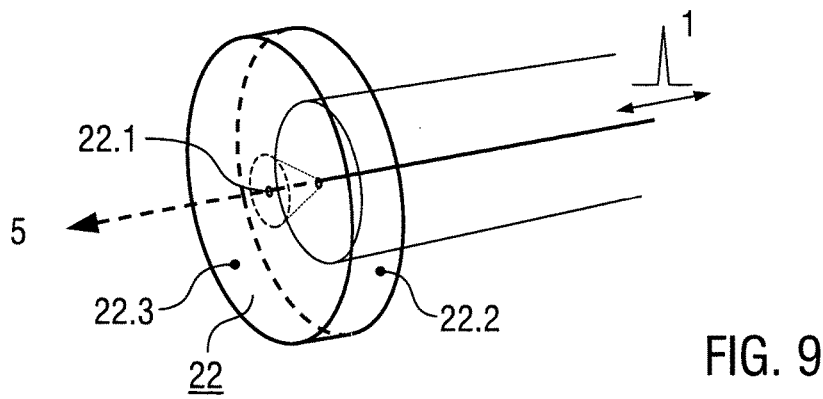
FIG. 9: a schematic illustration of the collinear output coupling of radiation through a conical hole in a resonator mirror.

FIG. 9 schematically illustrates a resonator mirror (e. g. mirror 24 of FIG. 1 or mirror 22 of FIG. 3) which includes an output coupling aperture 22.1 extending through the body of the mirror 22 from a reflecting surface 22.2 to the back-side 22.3 thereof. The light field of the intra-resonator laser-light 1 has a $1/e^2$ beam radius of the intensity on the reflecting surface 22.2 of about 5 mm. The aperture 22.1 has circular shape with a diameter of about 100 µm. Accordingly, there is only a weak distortion of the light field of the intra-resonator laser light 1, and high-order harmonic generation light 5, e. g. the $81^{st}$ harmonic of 1042 nm with λ=13 nm can be efficiently coupled out of the enhancement resonator. Alternatively, a slit shape of the aperture can be provided.

FIG. 10 illustrates further details of the inventive laser device 100 including the laser source device 10, the enhancement resonator 20, e. g. according to FIG. 2, and a control device 30. The laser device 10 comprises a laser unit 11 and a repetition rate (or continuous-wave-frequency) control 12, which is adapted e. g. for controlling the resonator length of the laser unit 11 as it is known from conventional lasers. Control 12 is a crucial feature to stabilize the oscillator repetition rate or continuous-wave frequency to the free spectral range and transmission resonances of the passive resonator, thus enabling efficiently enhancing the input laser light within the enhancement resonator. The laser light 2 generated with the laser unit 11 is directed via optical components 13, 14 and 15 to the input coupling resonator mirror 21 of the enhancement resonator 20. The optical components may comprise e. g. a polarization control device 13, a mode matching telescope 14 and a beam pointing stabilization device 15.

As an example, the enhancement resonator 20 has the bow tie configuration of the second embodiment (FIG. 2). All of the resonator mirrors are provided with adjustment devices, like e. g. piezo-electric drives being capable of adjusting the respective mirrors in e. g. two to five degrees of freedom— As examples, all mirrors can be tilted (two degrees of freedom), and at least one mirror can be translated along the direction of the beam (see arrow 3 in FIGS. 1 to 4). Additionally, the output coupling mirror (see FIG. 9) can be translated perpendicular to the direction of the beam, for centring the aperture relative to the beam. If the aperture has a slit shape, a rotation in a plane perpendicular to the beam is made possible. This rotational degree of freedom may be provided in particular for the toroidal and cylindrical mirrors as well. Adjustment devices also can be used for setting adaptive reflectors. As examples, adjustment stages 21.1 and 24.1 are illustrated at the resonator mirrors 21 and 24. The adjustment stages at the mirrors 22 and 23 are not shown.

The enhancement resonator 20 is arranged in a gas pressure tight container 40, in particular air pressure tight, being connected with a vacuum pump (not shown) and providing an environment of reduced air pressure. During operation of the laser device 100, a pressure of e. g about $10^{-3}$ Pa to $10^{-4}$ Pa is provided in the container. The air pressure tight container 40 includes wedged and/or anti-reflection coated windows 41, 42 for input coupling the laser light 2 and providing the reflected test signal 4 and e. g. XUV/X-Ray and/or THz radiation 5, respectively. The first window 41 is made of material being transparent in a wavelength range of the laser light 2, in particular in the wavelength range from UV via visible to IR-wavelengths, e. g. glass or plastic material. The second window 42 is transparent in a wavelength range of the X-Ray or THz radiation generated at the focal position 25 of the enhancement resonator 20. To this end, the second window 42 is made of e. g. beryllium or silicon. In particular with the generation of XUV and soft X-ray radiation, the second window can be replaced by a connection channel opening to a further vacuum device where the XUV or soft X-ray radiation is used for a particular application.

The enhancement resonator 20 is arranged on a mechanical oscillation damping device 50 (schematically illustrated), which preferably comprises an active mechanical oscillation isolation, like a six degree of freedom compensating electro-magnetic and/or piezo electric drive with a control system which damps mechanical vibrations by counter propagating the complete enhancement resonator setup relative to the vibration oscillation by about the same amplitude (mechanical oscillation isolation is possible in the range from 0.7 Hz to 200 Hz) or a passive mechanical oscillation absorber.

For generating hard X-ray radiation, a target is supplied by a target source device (not shown) at the focal position 25. In case of an electron bunch as target the electron beam of relativistic electrons is directed from an electron beam source (not shown) to the focal position 25 with a direction opposite to the propagation direction of the intra-resonator pulse 1 within the enhancement resonator. According to the direction of the intra-resonator laser pulse, the XUV/X-Ray radiation 5 is directed out of the container 40 through the second window 42.

The control device 30 comprises an electronic circuitry being configured for controlling the laser source device 10 and the enhancement resonator 20 such that the laser source device 10 is stabilized to the enhancement resonator's 20 length and the carrier-envelope offset frequency of the circulating laser light pulse or to the continuous-wave frequency of the standing-wave inside the enhancement resonator 20 for a coherent addition of the laser light at the resonator mirror 21. This is realized by controlling the frequency comb parameters of the laser source device's laser oscillator repetition rate and carrier-envelope offset frequency or continuous-wave frequency, e. g. with a resonator mirror mounted on a linear stage inside the laser oscillator, a resonator mirror mounted on a piezo electric actuator inside the laser oscillator, oscillator pump photon flux control, a pair of fused silica wedges, and with an electro-optic modulator inside the laser oscillator. On the other hand, the adjustment devices (e. g. 21.1 to 24.1) provide a proper enhancement resonator mirror alignment to build up a stable resonator. By supplying the test signal 4 to the control device 30, a control loop is provided, wherein the resonator mirrors, e. g. adaptive reflectors, are adjusted in dependency on a measured beam diameter, beam overlap and/or other beam parameters.

The features of the invention disclosed in the above description, the drawings and the claims can be of significance both individually as well as in combination for the realization of the invention in its various embodiments.

The invention claimed is:

1. An enhancement resonator being configured for generating intra-resonator laser light by coherent superposition of input laser light, comprising:
   at least three resonator mirrors spanning a ring resonator path in one common resonator plane, said ring resonator path being free of a laser light amplifying medium, wherein
   the at least three resonator mirrors include at least one of at least two toroidal mirrors and at least one cylindrical mirror, and
   the at least three resonator mirrors are configured such that cross-sectional areas of the intra-resonator laser light perpendicular to an incident propagation direction thereof at reflecting surfaces of the resonator mirrors differ from each other no more than 10%.

2. The enhancement resonator according to claim 1, wherein
   the at least three resonator mirrors include the at least two toroidal mirrors and at least one plane mirror.

3. The enhancement resonator according to claim 2, comprising
two toroidal mirrors and two plane mirrors having a bow tie configuration.

4. The enhancement resonator according to claim 2, comprising
two toroidal mirrors and at least one plane mirror having a configuration such that angles of incidence are at least 30° on all mirrors.

5. The enhancement resonator according to claim 1, wherein
the at least two toroidal mirrors have identical surface shapes and curvatures.

6. The enhancement resonator according to claim 1, wherein
each one of the toroidal mirrors, for a given angle of incidence, has identical focal lengths in the resonator plane and in a plane perpendicular to the resonator plane.

7. The enhancement resonator according to claim 1, wherein
the at least three resonator mirrors include the at least one cylindrical mirror and at least two spherical mirrors.

8. The enhancement resonator according to claim 7, comprising
two cylindrical mirrors and two spherical mirrors having a bow tie configuration.

9. The enhancement resonator according to claim 7, wherein
the two spherical mirrors and the two cylindrical mirrors have identical surface shapes and curvatures.

10. The enhancement resonator according to claim 1, wherein
at least one of the at least two toroidal mirrors and the at least one cylindrical mirror include adaptive reflectors having deformable surfaces.

11. The enhancement resonator according to claim 1, wherein
the at least three resonator mirrors are configured such that the cross-sectional areas are identical or differ from each other no more than 1%.

12. The enhancement resonator according to claim 1, wherein
the at least three resonator mirrors are configured such that a cross-sectional area of the intra-resonator laser light perpendicular to a propagation direction thereof has a circular shape.

13. The enhancement resonator according to claim 1, wherein
the at least three resonator mirrors are configured such that a cross-sectional area of the intra-resonator laser light perpendicular to an incident propagation direction thereof on reflecting surfaces of the resonator mirrors has an elliptic shape, wherein a larger main axis of the elliptic shape is parallel to the resonator plane.

14. The enhancement resonator according to claim 1, which comprises at least one of the features
the resonator path is free of a refractive element arranged for beam-shaping of the intra-resonator laser light,
further plane folding mirrors provide a folded configuration of the resonator path, and
an output coupling device is provided, which is configured for coupling of radiation created by an interaction of the intra-resonator laser light with a target material or an electron bunch out of the enhancement resonator.

15. The enhancement resonator according to claim 14, wherein
the output coupling device comprises one of the resonator mirrors having an aperture for output coupling the created radiation.

16. The enhancement resonator according to claim 1, wherein
an angle of incidence of the resonator path on at least one of spherical and toroidal mirrors of the resonator mirrors is below 20°.

17. A laser device, comprising:
a laser source device arranged for providing input laser light, and
an enhancement resonator according to claim 1, wherein the laser source device is arranged for coupling the input laser light into the enhancement resonator.

18. A method of generating intra-resonator laser light, comprising the steps of:
coupling input laser light into an enhancement resonator, which comprises at least three resonator mirrors spanning a ring resonator path in one common resonator plane, said resonator path being free of a laser light amplifying medium, and
coherent superposition of the input laser light in the enhancement resonator so that the intra-resonator laser light is created, wherein
the at least three resonator mirrors include at least one of at least two toroidal mirrors and at least one cylindrical mirror, and
the at least three resonator mirrors are configured such that cross-sectional areas of the intra-resonator laser light perpendicular to an incident propagation direction thereof at reflecting surfaces of the resonator mirrors differ from each other no more than 10%.

19. The method according to claim 18, wherein
the resonator path is formed by the at least two toroidal mirrors and at least one plane mirror.

20. The method according to claim 18, wherein
the resonator path is formed by the at least one cylindrical mirror and at least two spherical mirrors.

21. The method according to claim 18, wherein
the resonator path is formed having a bow tie or a triangular configuration.

22. The method according to claim 18, wherein
at least one of the at least two toroidal mirrors and the at least one cylindrical mirror include adaptive reflectors having deformable surfaces, the method further including the step of
setting the deformable surfaces of the adaptive reflectors.

23. The method according to claim 18, wherein
the at least three resonator mirrors are configured such that the cross-sectional areas are identical or differ from each other no more than 1%.

24. The method according to claim 18, further including the step of
configuring the at least three resonator mirrors such that a cross-sectional area of the intra-resonator laser light perpendicular to a propagation direction thereof has a circular shape.

25. The method according to claim 18, further including the step of
configuring the at least three resonator mirrors such that a cross-sectional area of the intra-resonator laser light perpendicular to an incident propagation direction thereof on reflecting surfaces of the resonator mirrors has an elliptical shape, wherein a larger main axis of the elliptical shape is parallel to the resonator plane.

26. The method according to claim 18, wherein
the resonator path is folded using further plane folding mirrors.

27. The method according to claim 18, comprising the further steps of:
providing a target material or an electron bunch at or nearby at least one focal position between two of the resonator mirrors, and
subjecting the target material or the electron bunch to an interaction with the intra-resonator laser light at or nearby the at least one focal position.

28. The method according to claim 27, further comprising the step of
output coupling of coherent radiation created by the interaction out of the enhancement resonator or collecting and guiding non-coherent radiation created by the interaction inside the enhancement resonator.

29. The method according to claim 28, wherein
the coherent radiation is coupled out of the enhancement resonator by output coupling through an aperture in one of the resonator mirrors.

\* \* \* \* \*